2,703,286

EDIBLE FOODSTUFF COATINGS

Norman S. Eppell, Chicago, Ill.

No Drawing. Application December 16, 1949,
Serial No. 133,491

14 Claims. (Cl. 99—166)

(Granted under Title 35, U. S. Code (1952), sec. 266)

The invention described herein, if patented, may be manufactured and used by or for the Government for governmental purposes without the payment to me of any royalty thereon.

This invention relates to edible methyl cellulose and pectinate coating compositions and products coated therewith. More particularly, the invention concerns the method of coating foodstuffs with a combination of edible low methoxyl pectinate modified by a calcium salt and methyl cellulose materials and the products obtained thereby. For convenience the term methyl cellulose will be used in this specification to refer to cellulose having methoxyl substituents of the character hereinafter set forth.

The application of coatings in the nature of gelatins, pectins, cellulose, and also a combination of agents in the nature of pectins and gelatins has heretofore been known. Such agents or admixtures however, have proven unsatisfactory as proper coatings for foodstuff under many conditions of use and may be improved upon by way of providing coatings of higher solids content, more uniformity, flexibility, gloss, strength, adhesiveness, and resistance to grease penetration or exudation. Further, there is need for development in utilizing edible type coating materials upon the provision of an improved edible coating composition. It is therefore an object of this invention to provide an edible coating for foodstuffs, having the above-mentioned desirable characteristics.

Another object of this invention is to provide an edible coating composition of a pectinate and methyl cellulose material.

An additional object of this invention is to provide food bars with coatings of calcium pectinate modified by methyl cellulose.

A further object of this invention is to provide improved coating mixtures of low methoxyl pectins compounded with a methyl cellulose and their process of application.

Further objects, advantages, adaptations and benefits will be apparent from the following description and illustrations. The coating of food bars particularly is desirable, and food bars will be used as an illustration of the application of the invention.

Broadly the compositions utilized herein for coating foodstuffs in the nature of food bars and the like is a two-component mixture of methyl cellulose and pectinate modified by a jelling or gelatinizing agent. The ratios of the components of the composition are variable within the range of from about 80 to about 20 parts methyl cellulose to about 20 to about 80 parts pectinate, modified by a calcium salt solution of a concentration on the order of from 1.5 per cent to 10 per cent. The preferred range is from about 50 parts methyl cellulose and about 50 parts pectinate to about 62.5 parts methyl cellulose and about 37.5 parts pectinate, with modification by a 5 per cent concentration of calcium salt, for obtaining maximum film strength and adherence in coating films.

In a coating application the permissible total concentration of solids can be varied from 2% to 8%. The preferred range for application by machine is 6% to 7%, and for manual dip-coating 3% to 4%. With either type of application less than 2% solids concentration produces a solution which is too thin to give a satisfactory coating. Solutions containing more than 8% solids are undesirably viscous and hold bubbles of air which cause imperfection in the finished coating. A solution concentration lower than 2% produces an undesirably wet and easily breakable coating.

The cellulosic addition agent used herein, is a methyl cellulose having a methoxyl content of from about 29% to about 32%, and further characterized by having a viscosity of from about 7 to about 30 centipoises as determined on a 2% water solution of the methyl cellulose at 20° C. The preferred viscosity range to be used in the compositions as hereinafter illustrated, is from 7 to 11 centipoises since this viscosity permits a higher concentration of solids in a useable solution than do the higher viscosity types. The higher total concentration of the solution is preferred, as the coating solution hereinafter described can be applied in a thin coat and dried at a more rapid rate. Higher viscosity material is less desirable than the lower viscosity material as it tends to hold more water and is difficult to dry.

The pectinates are of the low methoxyl type as represented by sodium pectinate, obtained for example, by commercial methods in the nature of alkaline de-esterification of citrus waste. The pectinate material may vary with respect to the degree of methoxyl content from 0% to 5%; however, the preferred range of methoxyl content in the composition hereinafter illustrated is from 3% to 3.5%.

The gelatinizing or modifying agent for the pectinate is a chemical reaction substance in the nature of an aqueous solution of calcium chloride which may vary from about 1.5% to about 10% in concentration. Other non-toxic soluble calcium and iron salts, such as the acetate or nitrate may be used as modifiers in the place of the chloride salt. The application of the calcium chloride solution for example, may be made before and/or after the application of the coating composition of methyl cellulose and pectinate. The preferred concentration for general application is a 5% solution of calcium chloride which may be used as a pre-dip, pre-spray, after-dip, or after-spray, when the concentration of the coating composition is in the preferred proportions as indicated. In coatings of the character as herein described, solution concentration below 1.5% calcium chloride produces films in which the reaction with the sodium pectinate is incomplete, and when over 10% concentration produces films which are brittle and generally unsatisfactory. While not desiring to confine myself to any particular theory, I believe that the jelling action of the calcium salt in my process is probably due to at least partial conversion of the sodium pectinate into calcium pectinate in situ on the foodstuff.

The foodstuff material particularly desired to be provided with a protective coating composition of the character herein described, are edibles of the nature of compressed cereal bars, compressed fruit bars, fruit and nut bars, candy bars, jelly bars, and many other food stuffs, either in piece or bar form which require protective edible coatings with or without some relative degree of flexibility.

A coating solution of the character herein described, for example, is prepared by mixing together an aqueous solution of methyl cellulose with an aqueous solution of sodium pectinate in the ratio of five parts by weight methyl cellulose, to three parts by weight sodium pectinate. As indicated, these coating compositions are preferably obtained by dissolving the methyl cellulose and sodium pectinate in separate solutions and subsequently mixing the separately prepared solutions with addition or extraction of the solvent to obtain a suitable solids concentration in the final mix. For example, the methyl cellulose solution is prepared by thoroughly wetting 11½ oz. of methyl cellulose, of pharmaceutical grade and having an average absolute viscosity of ten centipoises determined on a 2% aqueous solution at 20° C., with ½ gallon of water at 176–194° F. for from 20 to 30 minutes, adding another ½ gallon of water in the form of ice or water at a low temperature, bring the mixture to room temperature and with mild stirring or agitation, to prevent foaming of the mixture and produce a smooth mix.

The sodium pectinate solution is obtained, for example, by mixing 7 oz. low methoxyl sodium pectinate of the preferred character, with a gallon of water at room temperature. Solution mixture of the pectinate may be by suitable agitation as with high speed mixers or the like.

Thereafter the methyl cellulose and sodium pectinate solutions are mixed together and may be applied as coatings in the manner hereinafter described. Preferably, for best results, the mixed coating composition is to be utilized within a 24-hour period subsequent to its preparation. In general the coating solutions may be applied by hand or mechanical means. When the application of the coating solution is to be made by hand, or a semi-mechanical application is to be employed, for coating a compressed fruit bar for example, in the nature of a compressed date and apricot bar, the fruit bar is first dipped or sprayed with a 5% aqueous solution of calcium chloride. The dipped or sprayed fruit bar is then immediately immersed in a water solution of methyl cellulose and sodium pectinate prepared in the manner as described and containing a total concentration in the amount of 4% solids by weight. As heretofore described, the solution of methyl cellulose and sodium pectinate is prepared by mixing the separately prepared solutions, in the proportions as indicated, and concentrating the total solids content of the mixture to a desired value by addition or extraction of water if necessary. After application of the coating composition and while still wet, the bars are again dipped into or sprayed with a 5% water solution of calcium chloride. Immediately thereafter the bars are placed on suitable trays or racks to dry at approximately 90° F. to 100° F. or more, if the physical characteristics of the bar will permit additional heating without deterioration of the product. For solvent removal, the relative humidity is preferably maintained on the order of 50% or less and the drying is preferably secured with rapidly circulating air until the moisture content of the coated bar and coating does not exceed the moisture content of the original bars by more than substantially 1.5%.

When the coating application is primarily by machine, the initial dip or spray is eliminated so that the food bars may first obtain a uniform film of the coating solution. As indicated, the pectinate modifier may be used as a 5% calcium chloride solution to obtain satisfactory results. However, it may be preferable, e. g., in mechanical coating, to increase the concentration of calcium chloride proportionately to approximately an 8.7% solution to obtain a faster jelling action. It will be noted that the concentrations of the hand dipping solution was indicated as on the order of 4%; however, in a mechanical coating operation, the concentration of the coating solution is adjusted to obtain a solids content of about 6.95% which provides a continuous and uniform coating over the foodstuff. After the mechanical coating of the food bars is completed, they are immediately immersed into or sprayed with a 5% water solution of calcium chloride or an approximately 8.7% solution, if faster jelling action is desired, although a somewhat less flexible coating may result with the higher concentration of modifier solution. Thereafter the coated bars are dried on suitable racks under the condition as indicated above, or by other suitable drying means.

A further illustrative specific application is the coating of a cereal bar in the nature of a cooked or baked mixture of flour, soya grits, oatmetal, shortening, sugar, protein supplement, salt and vanilla, prepared by mixing the ingredients in desired conventional proportions and processed in a conventional manner. After processing, the prepared cereal bar is ground or crumbled and the granular mass is compressed into food bars of uniform size, on which the coating material of the character herein described is utilized. The application of the calcium chloride solution to the cereal bar is likewise dependent upon whether the method of applying the methyl cellulose and sodium pectinate composition is by hand or by mechanical means. When the coating is applied by hand the 4% concentration of the solution is preferred, and when applied by machine, the 6.95% concentration of the solution is preferable. In the application of the coating by the hand method, a 5% calcium chloride solution may first be applied by dipping the bar into the solution or spraying by conventional means. In the application of the methyl cellulose and pectinate coating by mechanical means, the initial application of calcium chloride solution is eliminated and the modifying agent applied subsequent to the application of the methyl cellulose and pectinate solution in the manner as above described. Preferably, in all coating processes, the final coating step is the application of a solidifying or modifying agent in the nature of a calcium salt solution. Thereafter the bars are dried by suitable means, or under the conditions as illustrated.

Similarly, a sweetmeat bar prepared from cooked ingredients such as sugar, milk fat, shortening, cheese, whey, dry non-fat milk solids, peanut butter, protein supplement and lactose in conventional proportions, and processed in a conventional manner, may be coated with the methyl cellulose and pectinate compositions modified by the calcium chloride solutions as desired. The application of the methyl cellulose and pectinate coating mixture may be either by hand or mechanical means as desired, with the application of the calcium chloride solution being dependent upon the method of application of the coating composition, in the manner as herein described.

Other food bars such as almond chocolate bars prepared in a conventional manner from almonds, sugar, sweet or semi-sweet chocolate, protein supplement and glycerin; sweet chocolate bars prepared from sugar, cocoa, butter, non-fat milk solids, chocolate liquor, and protein supplement; fruit bars prepared for example, from pitted dates, dried apricots, cereal, protein supplement and shortening, all in conventional proportionate parts and processed by conventional means, may be provided with coatings of the character as described and in the manner as illustrated. Other foodstuffs or products which may be more advantageously handled by the provision of protective edible or removable coatings may be provided with a modified coating compsition of the character herein described, applied in a manner as indicated, to afford an improved appearance in the coated product by reason of the increased gloss resulting from the combination, as well as prolonging the keeping qualities of the coated product.

For some purposes, a somewhat different method of application in coating foodstuffs with the modified pectinate and cellulose composition may be accomplished by using a preliminary coating of a calcium salt solution of the character as indicated, with the subsequent addition of a solution of low methoxyl sodium pectinate and methyl cellulose, and drying, in the manner as described. In this type of application the modifier coating is applied as a first step only, without utilizing a subsequent application of the modifier coating solution. The specific relative concentrations may be modified in accordance with the results desired of the final coating.

As above indicated, the methoxyl content of the pectinate used for coating foodstuffs in accordance with my invention may vary from 0% to 5%; thus, the term "low methoxyl" pectinate, as used in the specification and claims includes completely demethoxylated pectinate, the latter also being referred to in the literature as "pectate". When completely demethoxylated pectinate is employed, the solids content of a water solution containing methyl cellulose and pectinate in 5:3 ratio should be preferably 6.22% for machine application (as compared with 6.95% for incompletely demethoxylated pectinate), and for hand-dipping the solids concentration of the pectinate in the water solution should be preferably about 3.75% (as compared with about 4% in the case of incompletely demethoxylated pectinate). In the case of 1:3 ratio between completely demethoxylated pectinate and cellulose, the solids concentration of the water solution for machine application may be up to 7.28%; and in the case of a 1:4 ratio between completely demethoxylated pectinate and methyl cellulose, the corresponding solids concentration is about 7%. Otherwise, the preferred method of applying the pectinate-containing solution is the same in the case of completely demethoxylated pectinate as in the case of incompletely demethoxylated pectinate; i. e., the water-soluble sodium pectinate is applied to the foodstuff and is converted in situ into water-insoluble calcium pectinate.

I have also found that by applying completely demethoxylated sodium pectinate in water solution to the food, and converting the pectinate into water-insoluble pectinate in situ, a flexible coating may be obtained without the addition of methyl cellulose. The solids concentration in a water solution of completely demethoxylated pectinate, adapted for coating of food in accordance with my invention, may be about 4.5%. However, such a coating is somewhat inferior in strength and flexibility to coats containing methyl cellulose and pectinate.

In the provision of coating compositions of the character as herein described, the addition of methyl cellulose to the pectinate makes possible the use of a higher total solids in the coating solution. The methyl cellulose decreases the viscosity of the pectinate solution and renders machine application easier with a resulting smooth and uniform coating. The methyl cellulose provides an increase in tensile strength in addition to improving the flexible characteristics and toughness of the dried pectinate coating material. These features are particularly valuable in covering edges and corners wherein rupture is likely to occur. Further, some compressed food bars, such as cereal bars are ordinarily fragile, and with the provision of an edible coating of improved tensile strength and controlled flexibility, retention of the composite shape and uniformity of the bars is possible. Also, it has been discovered that the combination of methyl cellulose with the modified pectinate provides improved resistance to grease penetration and exudation and has an important advantage in coating food bars which, in the absence of a protective coating, tend to melt and stick together under conditions of elevated temperatures. Further, the coating composition is of an edible character, thus accomplishing the above-mentioned results, while at the same time requiring no unwrapping or difficult removal of strongly adherent inedible wrapping materials. This is particularly advantageous in the case of airplane pilots or others requiring the free use of one hand while eating.

It is possible to cover diverse food products including even a compressed bar of dried meat in accordance with my invention.

From the foregoing description of my improved edible coating compositions in illustrative applications, it will be obvious that the relative proportionate components of the composition and their modifying agent may be varied to obtain a coating having a desired toughness for any particular application. Furthermore, although specific proportionate parts are indicated as most suitable, such parts may be varied within the critical ranges as indicated for suitable applications all of which fall within the scope of the claims.

I claim:

1. The method of coating edible foodstuffs with a protective edible coating comprising applying a jelling agent in a wet state over the surface of the foodstuff, coating the foodstuff immediately thereafter with a solution of an alkali metal pectinate and methyl cellulose, applying a further coating of jelling agent over the solution coating, and drying the several coatings.

2. The method of coating edible foodstuffs with a protective edible coating comprising coating a foodstuff with a solution of an alkali metal pectinate and methyl cellulose, applying a jelling agent to said first coating while in a wet state and drying the composite coatings.

3. The process of coating a foodstuff comprising applying to the surface of the foodstuff a solution of methyl cellulose and sodium pectinate, converting said sodium pectinate into calcium pectinate in situ on said foodstuff, and expelling the solvent, whereby a flexible coating is formed on said foodstuff.

4. The method of coating edible foodstuffs with a protective edible coating comprising applying a jelling agent in solution concentration on the order of from 1.5% to 10% over the surface of the foodstuff, coating the foodstuff immediately thereafter with a solution of a pectin material and methyl cellulose in a total solids concentration on the order of from 2% to 8%, applying a further coating of jelling agent in solution concentration on the order of from 1.5% to 10% over the methyl cellulose and pectin coatings, and drying the several coatings.

5. The process of encasing foods with an edible film envelope which comprises coating the food with a solution containing methyl cellulose and an alkali low-methoxyl pectinate, contacting the coated food with a solution containing calcium ions to gel the coating, then drying the gel coating to form said film.

6. The process of encasing foods with an edible film envelope which comprises coating the food with a solution containing methyl cellulose and an alkali low-methoxyl pectinate having a methoxyl content of from 0% to 5%, contacting the coated food with a solution containing calcium ions to gel the coating, then drying the gel coating to form said film.

7. A foodstuff material provided with an edible coating composition essentially comprising an intimate mixture of methyl cellulose and an alkali metal pectinate insolubilized by a soluble calcium salt.

8. A foodstuff material according to claim 7, wherein said methyl cellulose has a methoxyl content on the order of from 29% to 32%.

9. A foodstuff material provided with an edible coating composition essentially comprising an intimate mixture of methyl cellulose and a pectinate in proportionate parts of from about 80 to about 20 parts methyl cellulose and from about 20 to 80 parts pectinate, the pectinate being an alkali metal pectinate insolubilized by calcium chloride.

10. A foodstuff material provided with a coating of an intimate mixture of methyl cellulose and low methoxyl alkali metal pectinate insolubilized by calcium chloride.

11. A foodstuff material provided with a coating of an intimate mixture of methyl cellulose and low methoxyl alkali metal pectinate insolubilized by calcium chloride, wherein said methyl cellulose and pectinate are present in the ratio of about 5 to 3.

12. A foodstuff material provided with a flexible coating resistant to grease penetration and exudation, containing an intimate mixture of methyl cellulose and an alkali metal pectinate insolubilized by a jelling agent.

13. A composite edible coating solution of low methoxyl alkali metal pectinate and methyl cellulose in water.

14. A foodstuff material provided with an edible coating essentially comprising an intimate mixture of methyl cellulose and low methoxyl alkali metal pectinate having a methoxyl content of from 0% to 5% insolubilized by a jelling agent.

References Cited in the file of this patent

UNITED STATES PATENTS

| Number | Name | Date |
|---|---|---|
| 1,997,616 | Wallerstein | Apr. 16, 1935 |
| 2,222,000 | Schmidt | Nov. 19, 1940 |
| 2,233,574 | Baker et al. | Mar. 4, 1941 |
| 2,245,576 | Dickinson et al. | June 17, 1941 |
| 2,334,281 | Olsen et al. | Nov. 16, 1943 |
| 2,380,739 | Evans et al. | July 31, 1945 |
| 2,410,382 | Kaplan | Oct. 29, 1946 |
| 2,439,460 | Engler | Apr. 13, 1948 |
| 2,480,103 | Fux | Aug. 30, 19449 |
| 2,517,595 | Owens et al. | Aug. 8, 1950 |

FOREIGN PATENTS

| Number | Country | Date |
|---|---|---|
| 496,775 | Great Britain | Dec. 6, 1938 |